(12) United States Patent
Hu et al.

(10) Patent No.: US 9,904,160 B2
(45) Date of Patent: Feb. 27, 2018

(54) LIGHT-EMITTING DEVICE AND RELATED LIGHT SOURCE SYSTEM

(71) Applicant: APPOTRONIC CHINA CORPORATION, Shenzhen (CN)

(72) Inventors: Fei Hu, Shenzhen (CN); Haixiong Hou, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 14/785,846

(22) PCT Filed: Apr. 11, 2014

(86) PCT No.: PCT/CN2014/075194
§ 371 (c)(1),
(2) Date: Oct. 20, 2015

(87) PCT Pub. No.: WO2014/169785
PCT Pub. Date: Oct. 23, 2014

(65) Prior Publication Data
US 2016/0085143 A1 Mar. 24, 2016

(30) Foreign Application Priority Data
Apr. 20, 2013 (CN) .......................... 2013 1 0138613

(51) Int. Cl.
*H01S 3/00* (2006.01)
*G03B 21/20* (2006.01)
*G02B 27/09* (2006.01)
*G02B 27/10* (2006.01)
*G02B 27/12* (2006.01)
(Continued)

(52) U.S. Cl.
CPC ......... *G03B 21/208* (2013.01); *G02B 3/0006* (2013.01); *G02B 19/0028* (2013.01);
(Continued)

(58) Field of Classification Search
CPC .......................... G03B 21/208; G03B 21/2033
(Continued)

(56) References Cited

U.S. PATENT DOCUMENTS 5,793,783 A    8/1998 Endriz
2012/0212929 A1    8/2012 Li
(Continued)

FOREIGN PATENT DOCUMENTS

CN    102591120 A  *  7/2012
CN    102608855 A    7/2012
(Continued)

OTHER PUBLICATIONS

International Search Report in the parent PCT application No. PCT/CN2014/075194, dated Jul. 16, 2014.
(Continued)

*Primary Examiner* — Elmito Breval
*Assistant Examiner* — Keith Delahoussaye
(74) *Attorney, Agent, or Firm* — Chen Yoshimura LLP

(57) ABSTRACT

A light-emitting device (1) and a related light source system. The light-emitting device (1) comprises a laser light source (11, 21, 31) and a light collecting system (12, 22). The laser light source (11, 21, 31) comprises a first laser array (111, 211, 311) and a second laser array (112, 212, 312) for respectively generating a first light and a second light with different wavelength ranges. The light collecting system (12, 22) is used for collecting the light emitted from the laser light source arrays. The ratio of the divergence angle of the collected second light to that of the first light is less than or equal to a predetermined value. The predetermined value is 0.7. The light-emitting device (1) is capable of generating two kinds of light beams with different etendues.

18 Claims, 6 Drawing Sheets

(51) Int. Cl.
*G02B 3/00* (2006.01)
*G02B 19/00* (2006.01)
*G02B 27/14* (2006.01)
*G02B 27/30* (2006.01)
*F21V 8/00* (2006.01)

(52) U.S. Cl.
CPC ..... *G02B 19/0057* (2013.01); *G02B 27/0927* (2013.01); *G02B 27/0955* (2013.01); *G02B 27/1013* (2013.01); *G02B 27/123* (2013.01); *G02B 27/141* (2013.01); *G02B 27/30* (2013.01); *G03B 21/204* (2013.01); *G03B 21/2013* (2013.01); *G02B 6/0006* (2013.01)

(58) Field of Classification Search
USPC .......................................................... 362/553
See application file for complete search history.

(56) References Cited

U.S. PATENT DOCUMENTS

2012/0236212 A1\* 9/2012 Itoh ........................ G02B 3/005
348/744

2013/0088471 A1\* 4/2013 Kitano ................. H04N 9/3114
345/208

FOREIGN PATENT DOCUMENTS

| CN | 102734659 A | 10/2012 |
| CN | 102929086 A | 2/2013 |
| CN | 103279005 A | 9/2013 |
| JP | 61223810 A | 10/1986 |
| JP | 07-199117 | 8/1995 |

OTHER PUBLICATIONS

IPRP in the parent PCT application No. PCT/CN2014/075194, dated Oct. 20, 2015.
Supplementary European Search Report in corresponding application EP 14784933.5, dated Oct. 13, 2016.
Korean Office Action, in a counterpart application KR 10-2015-7032218, dated Sep. 28, 2016.

\* cited by examiner

LIGHT-EMITTING DEVICE AND RELATED LIGHT SOURCE SYSTEM

BACKGROUND OF THE INVENTION

Field of the Invention

This invention relates to illumination and display fields, and in particular, it relates to a light emitting device and related light source system.

Description of Related Art

In conventional projection and display fields, a commonly used technique for providing a white light source is by using a blue excitation light to excite a yellow phosphor to generate a yellow light, and mixing the yellow light with unabsorbed blue light to generate a white light. In this technique, because 445 nm blue laser light has a relatively high excitation efficiency for the phosphors, 445 nm blue laser light is often used as the excitation light source. However, the color of the 445 nm blue light is slightly purple, and is not suitable for direct use in projection. Therefore, an improved technique uses a 455 nm blue light to excite the yellow phosphor to generate the yellow converted light, and uses a 462 nm blue laser to be mixed with the yellow converted light to generate the white light.

Refer to FIG. 1, which schematically illustrates the structure of a light source system according to a conventional technology. The light source system includes a first light emitting device 10, a second light emitting device 20, a wavelength conversion device 30 and a light collecting system 40. The first light emitting device 10 includes a first laser array 101 and condenser lens 102. The first laser array 101 includes multiple laser elements, for generating 455 nm blue laser light. The light generated by the first laser array 101 is collected by the condenser lens 102 and output. The second light emitting device 20 includes a second laser array 201 and condenser lens 202. The light generated by the second laser array 201 is collected by the condenser lens 202 and output.

The light collecting system 40 includes a filter plate 401 and a collecting lens 402, where the filter plate 401 transmits blue light and reflects yellow light. The light emitted by the first light emitting device 10 and the second light emitting device 20 are respectively incident on the filter plate 401 from its two sides, where the light emitted by the first light emitting device 10 sequentially passes through the filter plate 401 and the collecting lens 402 to reach the wavelength conversion device 30. The wavelength conversion device 30 includes a wavelength conversion layer, which includes a yellow phosphor, for absorbing the blue laser light from the first light emitting device 10 and generating a yellow converted light. The yellow converted light is collected by the collecting lens 402 and then incident on the filter plate 401; it is reflected by the filter plate 401, and combined with the light emitted by the second light emitting device 20 which is transmitted by the filter plate 401, to become an output light beam.

Because the laser light has a Gaussian distribution, while the converted light has a Lambertian distribution, to more uniformly mix the light emitted by the second light emitting device 20 and the yellow converted light, the second light emitting device 20 further includes a light homogenizing rod 203, disposed on the output light path of the condenser lens 202, to homogenize the blue laser light outputted from the condenser lens 202. Meanwhile, to make the light power density of the light spot formed by the first light emitting device 10 on the wavelength conversion device 30 more uniform, and to improve excitation efficiency, the first light emitting device 10 further includes a light homogenizing rod 103, disposed on the output light path of the condenser lens 102, to homogenize the blue laser light outputted from the condenser lens 102.

However, because such a light source system includes many optical elements, its size is large. One solution for this problem is to combine the first laser array and the second laser array into one laser array, and to use one condenser lens and one light homogenizing rod to collect and homogenize the light. However, in the downstream light path, if the 445 nm blue light and the 462 nm blue light are separated using wavelength-based light separation, because the wavelengths of the two blue lights are relatively close, the filter plate is required to have a very steep light filter curve, which increases cost.

SUMMARY

A technical problem solved by the present invention is to provide a light emitting device that generates two light beams of different etendues.

An embodiment of the present invention provides a light emitting device, comprising:

A laser light source, including a first laser array and a second laser array, for respectively generating a first light and a second light having different wavelength ranges;

A light collecting system, for collecting the lights generated by the laser arrays, wherein a ratio of a divergence angle of the second light after the collecting system to a divergence angle of the first light after the collecting system is less than a predetermined value, wherein the predetermined value is 0.7.

Preferably, the light collecting system includes a collecting device and a collimating lens, wherein the collecting device includes at least one condenser lens for condensing the light beam from the laser light source, and wherein the collimating lens collimates the light beam from the collecting device.

The collecting device includes a first region and a second region, the first region being the region where the first light passes, the second region being the region where the second light passes, wherein a combined focal length of the first region is greater than a combined focal length of the second region, and wherein in the output light of the laser light source, a divergence angle of the first light is greater than a divergence angle of the second light, so that a ratio of a divergence angle of the second light after the light collecting system to a divergence angle of the first light after the light collecting system is less than the predetermined value.

Preferably, in the output light of the laser light source, the divergence angles of the first light and the second light are identical.

The light collecting system includes a collecting device and a collimating lens, wherein the collecting device includes at least one condenser lens, for condensing the light beam from the laser light source, and wherein the collimating lens collimates the light beam from the condenser lens.

The collecting device includes a first region and a second region, the first region being the region where the first light passes, the second region being the region where the second light passes, wherein a ratio of a combined focal length of the first region is to a combined focal length of the second region is less than or equal to the predetermined value.

Preferably, the first region of the collecting device includes a first collecting lens, disposed on the output light path of the laser light source, wherein a part of the first collecting lens condenses the first light; wherein the second region of the collecting device includes a second collecting lens, disposed on the output light path of the second light that has passed through the first collecting lens, to condense the second light.

Preferably, the collecting device includes a condenser lens and a reflector cup with an aperture, wherein the condenser lens includes a first surface facing the laser light source and a second surface opposite the first surface, wherein the second surface is provided with a filter film that transmits the second light and reflects the first light; wherein the reflector cup is disposed on the output light path of the laser light source, and its reflecting surface faces the second surface of the condenser lens.

The first light from the laser light source is directly incident onto the reflector cup, and is reflected by it to the second surface of the condenser lens, and reflected again to the collimating lens.

The second light from the laser light source is directly incident on the condenser lens, and is collected by it onto the collimating lens.

The output light of the collimating lens passes through the aperture of the reflecting cup to be output.

Preferably, the light emitting device includes a light homogenizing rod, wherein the collecting lens includes a first condenser lens and a second condenser lens, the second condenser lens being disposed between the first condenser lens and the focal point of the first condenser lens, the second condenser lens having a first surface facing the first condenser lens and a second surface opposite the first surface, wherein the second surface is provided with a filter film which transmits the second light and reflects the first light.

The first laser array is disposed on a side of the first condenser lens that faces the second condenser lens, the second laser array is disposed on a side of the second condenser lens that faces away from the first condenser lens, and the first laser array and the first condenser lens respectively have apertures at locations corresponding to an optical axis of the collimating lens, the light homogenizing rod is disposed on an output light path of the collimating lens, and sequentially penetrates through the apertures of the first condenser lens and the first laser array.

The first light from the first laser array is collected by the first condenser lens to the first surface of the second condenser lens, and is reflected by it to the collimating lens, and then enters the light homogenizing rod.

The second light from the second laser array is collected by the second condenser lens to the collimating lens, is collimated by it and then enters the light homogenizing rod.

Preferably, the different regions of the light collecting system through which the first light and the second light of the output light of the laser light source pass respectively have identical focal lengths.

In the output light of the laser light source, a ratio of a divergence angle of the second light to a divergence angle of the first light is less than or equal to the predetermined value.

Preferably, the laser light source further includes a first collimating lens array and a second collimating lens array, wherein collimating lenses in the first and second collimating lens arrays respectively correspond one to one with the laser elements of the first and second laser arrays, for collimating the light emitted by the corresponding laser element.

A focal length of the collimating lenses of the second collimating lens array is grater than a focal length of the collimating lenses of the first collimating lens array, so that a ratio of a divergence angle of the collimated second light to a divergence angle of the collimated first light is less than or equal to the predetermined value, or, A degree of off-focus of the laser elements of the first laser array and their corresponding collimating lenses is greater than a degree of off-focus of the laser elements of the second laser array and their corresponding collimating lenses, so that a ratio of a divergence angle of the collimated second light to a divergence angle of the collimated first light is less than or equal to the predetermined value, or, A divergence angle of the light emitted by the laser elements of the first laser array is greater than a divergence angle of the light emitted by the laser elements of the second laser array, so that a ratio of a divergence angle of the collimated second light to a divergence angle of the collimated first light is less than or equal to the predetermined value.

Preferably, a scattering plate or a fly-eye lens pair is provided on a propagation path of the first light within the laser light source, and the scattering plate or the fly-eye lens pair avoids a propagation path of the second light.

Preferably, the light emitting device includes a light homogenizing rod, to homogenize the light from the light collecting system, wherein all cross sections of the light homogenizing rod in a direction perpendicular to the light homogenizing rod are identical.

The laser light source includes an emitting region a non-emitting region, wherein the first and second laser arrays are located in the emitting region.

The light collecting system includes a reflective focusing device and a collimating lens, wherein the reflective focusing device includes a focusing region and a non-focusing region, wherein the focusing region focuses the output light from the laser light source and reflects it to the collimating lens, wherein the collimating lens collimates the light beam from the reflective focusing device and outputs it to the light homogenizing rod.

The non-emitting region of the laser light source and the non-focusing region are located on the same straight line parallel to the output optical axis of the laser light source, and the light homogenizing rod penetrates through the non-emitting region and/or the non-focusing region.

Preferably, the reflective focusing device includes a condenser lens with an aperture and a reflecting element, wherein the aperture of the condenser lens is the non-focusing region, and wherein the region of the condenser lens other than the aperture and the reflecting element are the focusing region.

The region of the condenser lens other than the aperture condenses the output light from the laser light source, and the reflecting element reflects the light beam from the condenser lens to the collimating lens.

The light homogenizing rod penetrates through the aperture of the condenser lens and the non-emitting region of the laser light source.

Preferably, the reflective focusing device is a reflecting cup, wherein a center region of the reflecting cup is the non-focusing region, and a region other than the center region is the focusing region, and wherein the light homogenizing rod penetrates through the non-emitting region of the laser light source.

Preferably, the reflective focusing device includes a reflecting element and a reflecting cup with an aperture, wherein the aperture of the reflecting cup is the non-focusing region, and the region other than the aperture and the reflecting element are the focusing region.

The light homogenizing rod penetrates through the aperture of the reflecting cup.

Preferably, a third reflecting element is mounted in the non-emitting region of the laser light source.

Preferably, the light emitting device further includes a light homogenizing rod, for homogenizing the light from the light collecting system, wherein all cross sections of the light homogenizing rod in a direction perpendicular to the light homogenizing rod are identical.

Preferably, the predetermined value is 0.3.

An embodiment of the present invention further provides a light source system, including:

The above light emitting device;

A wavelength conversion device, having a wavelength conversion layer which absorbs the first light from the light emitting device to generate a converted light; wherein one surface of the wavelength conversion layer receives the first light, and outputs from the same surface at least a part of the first light, and at least a part of the converted light or at least a part of a mixed light of the converted light and unabsorbed first light;

A scattering device, including a scattering layer which scatters the second light from the light emitting device; wherein the scattering layer receives the second light on one surface, and outputs on the same surface at least a part of the second light;

A light guidance device, including a first region, wherein the second light and the first light from the light emitting device are incident on the light guidance device from a first light path, wherein at least a part of the second light is incident on the first region, and at least a part of the first light is incident on a region of the light guidance device other than the first region; wherein the light incident on the region of the light guidance device other than the first region is guided to the wavelength conversion device, and wherein the light incident on the first region of the light guidance device is guided to the scattering device; wherein the region of the light guidance device other than the first region further guides converted light from the wavelength conversion device and the second light from the scattering device to a second light path to be output.

Compared to conventional technologies, embodiments of the present invention have the following advantages:

In this invention, because a ratio of the divergence angle of the first light output by the light collecting system of the light emitting device and that of the second light is less than or equal to 0.7, the etendue difference between the two light beams is relatively large, so that in the light path downstream of the light emitting device, the etendue difference of the two light beams can be used to separate the two light beams.

DETAILED DESCRIPTION OF PREFERRED EMBODIMENTS

In the descriptions below, the term "combined focal length" refers to the equivalent focal length of an optical system formed by various optical elements.

Embodiments of the present invention are described below with reference to the drawings.

First Embodiment

Figure 1:
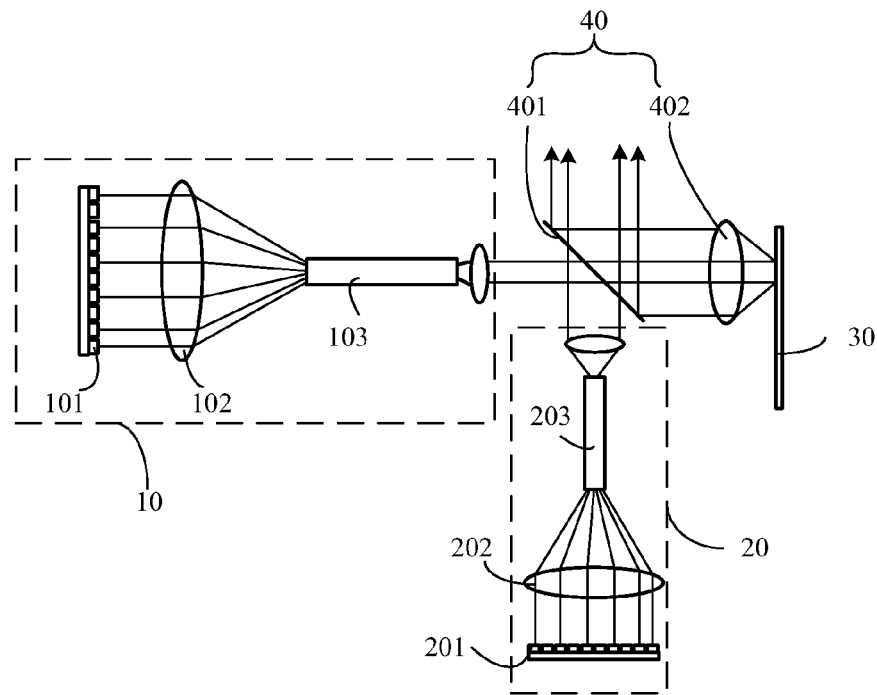
FIG. 1 schematically illustrates the structure of a light source system according to a conventional technology.
Figure 2A:
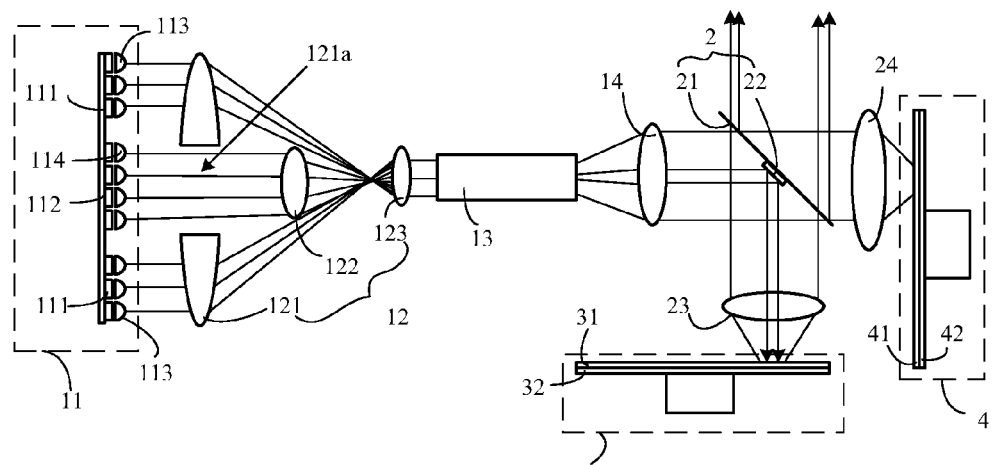
FIG. 2A schematically illustrates the structure of a light source system according to an embodiment of the present invention.

Refer to FIG. 2A, which schematically illustrates the structure of a light source system according to an embodiment of the present invention. The light source system includes a light emitting device 1, a light guidance device 2, a scattering device 3 and a wavelength conversion device 4.

The emitting device 1 includes a laser light source 11, a light collecting system 12 and a light homogenizing rod 13. The laser light source 11 includes a first laser array 111 and a second laser array 112 which emit light in the same direction, for respectively generating a first light and a second light having different wavelength ranges. In this embodiment, the first light is a blue laser light having a wavelength within the range of 440 nm to 460 nm, and the second light is a blue laser light having a wavelength within the range of 460 nm to 480 nm. The first laser array 111 and the second laser array 112 are disposed on the same plane, where the first laser array 111 surrounds the second laser array 112, and the divergence angles of the multiple laser elements within the two laser arrays are the same. Of course, in practical applications, the first and second laser arrays may be disposed on different planes.

Because the light generated by the laser elements has a certain divergence angle, the laser light source 11 further includes a first collimating lens array 113 and a second collimating lens array 114, where the collimating lenses of the first and second collimating lens arrays respectively correspond one to one with the laser elements of the first and second laser arrays, for collimating the light emitted by the corresponding laser elements. In practical applications, the laser light beams collimated by the collimating lenses are not strict parallel light beams, but have a certain divergence angle, which is smaller than the divergence angle of the light emitted by the laser elements. When the requirement for brightness of the light spot is not very high, the collimating lens arrays may be omitted.

The light collecting system 12 includes a collection device and a collimating lens 123, where the collection device includes a first region and a second region; the first regions is the regions passed through by the first light, and the second region is the regions passed through by the second light.

Figure 2B:
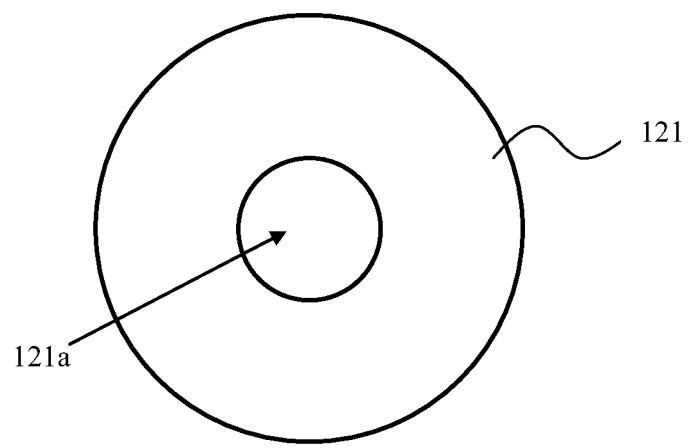
FIG. 2B is a right side view of the first collecting lens in the light source system of FIG. 2A.

In this embodiment, the collection device includes a first collecting lens 121 and a second collecting lens 122, respectively constituting the first region and the second region. These two lenses are both convex lenses. Refer to FIG. 2B, which is a right side view of the first collecting lens in the light source system of FIG. 2A. The first collecting lens 121 is located on the output light path of the laser light source 11, and the first collecting lens 121 has an aperture 121a at a location corresponding to the propagation path of the second light. The first light emitted by the laser light source 11 is condensed by the first collecting lens 121, while the second light directly passes through the aperture 121a of the first collecting lens 121. The focal length of the second collecting lens 122 (denoted f2, which is the combined focal length of the second region) is smaller than the focal length of the first collecting lens 121 (denoted f1, which is the combined focal length of the first region). In this embodiment, the ratio f2/f1 is less than or equal to 0.3. The second collecting lens 122 is disposed on the propagation path of the second light which has passed through the first collecting lens 121, for condensing the second light. The first and second collecting lenses are confocal.

The collimating lens 123 is located on the output light path of the second collecting lens 122, for collimating the first and second lights which have respectively passed through the first and second collecting lenses. The focal length of the collimating lens 123 is denoted f3. The light beam collimated by the collimating lens 123 enters the light homogenizing rod 13 to be homogenized. All cross sections of the light homogenizing rod in a direction perpendicular to the light homogenizing rod are identical.

The output light of the laser light source 11 is formed by multiple small light beams, each small light beam being emitted by one laser element. The small light beams are parallel to each other, and each internally has a certain divergence angle. After the first light and second light of the output light are respectively collected by the various collecting lenses and collimated by the common collimating lens, the light emitting surface of each small light beam is reduced. Based on the conservation of etendue, it can be seen that the divergence angle of each small light beam increases; the rate of increase of the divergence angle for the small light beams in the first light is f1/f3, while the rate of increase of the divergence angle for the small light beams in the second light is f2/f3. Because both the first light and the second light that enter the light homogenizing rod 13 are collimated light beams, the divergence angles of these two light beams are respectively equal to the divergence angles of the small light beams within these two light beams. In this embodiment, because f2/f1 is less than or equal to 0.3, the ratio of the divergence angle of the second light outputted by the light collecting system 12 to that of the first light is less than or equal to 0.3.

Because all cross sections of the light homogenizing rod 13 in the direction perpendicular to the light homogenizing rod 13 are identical, the light beam after homogenizing by the light homogenizing rod 13 only changes its distribution within the plane and does not change its angular distribution; therefore, after the light homogenizing rod 13, the ratio of the divergence angle of the second light to that of the first light is still less than or equal to 0.3. Because of such a large difference between the divergence angles of the two light beams, in the downstream optical path, the etendue difference of the two light beams can be used to separate the two light beams.

After being collected by the first and second collecting lenses of the light collecting system 12, the small light beams are focused to the same focal point, so the large light beam formed by the multiple small light beams has a large divergence angle, while each small light beam still has a small internal divergence angle. If the output lights collected by the first and second collecting lenses are directly input into the light homogenizing rod 13 to be homogenized, each small light beam will be reflected multiple times within the light homogenizing rod 13 and after they exit the light homogenizing rod their internal divergence angle will remain small, while the divergence angle of the large light beam formed by the multiple small light beams still remain large. As a result, the light spot formed on the plane of the exit port of the light homogenizing rod 13 will still be formed of multiple independent small light spots, rather than a uniform and complete large light spot. Moreover, the divergence angle of the large light beam will be relatively large, which is disadvantageous for downstream light collection.

Therefore, the light collecting system 12 preferably further includes the collimating lens 123. After the output lights of the first and second collecting lenses are collimated by the collimating lens 123, the various small light beams are collimated, and the internal divergence angle of the small light beams becomes larger. This way, the large light beam after the light homogenizing rod 13 has a relatively small divergence angle, while the multiple small light beams within the large light beam have a relatively large divergence angle, so that the light spot formed on the plane of the exit port of the light homogenizing rod 13 is a uniform and complete large light spot. Meanwhile, the divergence angles of the first and second lights are smaller as compared to when the collimating lens 123 is not provided, which is advantageous for downstream light collection.

The light guidance device 2 includes a first filter plate 21 and a first reflecting element 22, where the first filter plate 21 transmits the first light and the second light and reflects the converted light, and the first reflecting element 22 is used to reflect the second light. In this embodiment, the first reflecting element 22 is a small filter plate, which transmits the first light and reflects the second light. The first reflecting element 22 is disposed in the first region of the light guidance device 2. In this embodiment, the first region is a center region of the first filter plate 21.

The light output from the light homogenizing rod 13 is incident on the light guidance device 2 via a first light path. For convenience and to enhance the downstream light utilization efficiency of the two light beams, a collimating lens 14 is preferably provided on the output light path of the light homogenizing rod 13, to collimate the output light from the light homogenizing rod 13. Because when the first light and the second light exit the light homogenizing rod 13, the light emitting surface areas of both light beams are equal to the area of the exit port of the 13, and because the ratio of the divergence angle of the second light to that of the first light is less than or equal to 0.3, as a result, for the collimated light beam which is outputted from the light homogenizing rod 13 and collimated by the collimating lens 14, on any cross section of the collimated light beam perpendicular to its optical axis, the two light spots formed by the first light and the second light are both centered with respect to the optical axis, and the size of the light spot of the second light is smaller than that of the first light. The smaller the ratio of the divergence angle of the second light outputted by the light homogenizing rod 13 to that of the first light, the smaller the size of the light spot formed by the second light relative to the light spot formed by the first light.

The light beam collimated by the collimating lens 14 is incident on the light guidance device 2, where a center part of the collimated light beam (including the first light and the second light) is incident on the center region of the first filter plate 21, i.e. incident on the first reflecting element 22, and is reflected to the scattering device 3; the remaining light (i.e. the first light) is incident the regions of the first filter plate 21 other than the first reflecting element 22, and is transmitted to the wavelength conversion device 4. It can be seen that when the smaller the ratio of the divergence angle of the second light from the light homogenizing rod 13 to that of the first light, the small the area of the first reflecting element 22 relatively to the first filter plate 21 can be.

In practical applications, the first reflecting element 22 can alternatively be a reflecting mirror of a polarizing plate, as long as it can reflect the second light to the scattering device 3. An aperture can be provided at a first position of the first filter plate 21, where the first reflecting element 22 is mounted inside the aperture. For ease of fabrication, the first reflecting element 22 is preferably directly stacked with and mounted on the first region of the first filter plate 21. The first reflecting element 22 can be mounted on a side of the first filter plate 21 that faces away from the laser light source 11 or faces toward the laser light source 11, preferably the latter, so as to avoid loss caused when the second light has to pass through the first filter plate 21 both before and after being reflected by the first reflecting element 22.

The scattering device 3 includes stacked scattering layer 31 and reflective substrate 32. The scattering layer 31 has a first surface and a second surface opposite to each other, where the second surface is in contact with the reflective substrate 32, and the first surface receives the light beam from the light guidance device 2 and also outputs the light beam scattered by the scattering device 3. Of course, when the scattering layer 31 is sufficiently thick, the reflective substrate 32 can be omitted and the majority of the light beam can still be output from the first surface.

The wavelength conversion device 4 includes stacked wavelength conversion layer 41 and reflective substrate 42. The wavelength conversion layer 41 has a first surface and a second surface opposite to each other, where the first surface faces away from the reflective substrate 42, for receiving the first light. The wavelength conversion layer 41 contains wavelength conversion materials, which absorbs the first light from the light guidance device 2 and outputting from the first surface a converted light or a mixed light of the converted light with unabsorbed excitation light. Of course, when the wavelength conversion layer 41 is sufficiently thick, the reflective substrate 42 can be omitted and the majority of the converted light or the mixed light of the converted light with unabsorbed excitation light can still be output from the first surface. In this embodiment, the wavelength conversion material is a yellow wavelength conversion material, for receiving the excitation light and converting it to a yellow converted light to be output. The converted light has a Lanbertian distribution. In practical applications, the wavelength conversion materials may be a phosphor, quantum dots, a fluorescent dye, or other materials that has wavelength conversion abilities. The wavelength conversion materials can be other colored wavelength conversion materials.

The light outputted by the scattering device 3 and the wavelength conversion device 4 are respectively collected by the collecting lenses 23 and 24 and are respectively incident on the two sides of the light guidance device 2. The converted light is reflected by the first filter plate 21 and is output along the second light path. The first light that is unabsorbed by the wavelength conversion device 4 transmits through the first filter plate 21 and becomes lost. Of the light beam scattered by the scattering device 3, the light that is incident on the first reflecting element is reflected and become lose, and the light that is incident on the region of the first reflecting element 22 other than the first filter plate 21 transmits through the light guidance device 2 and is combined with the converted light into one light beam which is output along the second light path. To minimize the light output from the scattering device 3 that is lost due to reflection by the first reflecting element 22, the area of the first reflecting element 22 is preferably smaller than 10% of the area of the first filter plate 21.

In this embodiment, the entendue difference between the first light and second light output from the light homogenizing rod 13 is relatively large, so the light guidance device 2 can separate these two lights based on their etendue difference. This way, the first reflecting element 22 of the light guidance device 2 is very small relative to the first filter plate 21, so the second light before the scattering device and the second light after scattering by the scattering device can be separated based on their etendue difference. Meanwhile, the light guidance device 2 combines the second light and the converted light based on their wavelength difference, so that the structure of the entire light source system is compact and small.

In this embodiment, to minimize the loss of the output light of the scattering device 3 that is reflected by the first reflecting element 22 when it is incident on the light guidance device 2, the area of the first reflecting element 22 is preferably as small as possible. In this situation, to ensure that the second light output by the light homogenizing rod 13 can be completely incident on the first reflecting element 22, the ratio of the divergence angle of the second light in the output light to that of the first light is less than or equal to 0.3. However, in practical applications, when the requirement for the excitation efficiency of the excitation light is not very high, a part of the second light can be incident on region of the first filter plate 21 other than the first reflecting element 22 and transmit through it to the wavelength conversion device 4 to excite the wavelength conversion material. In this situation, the ratio of the divergence angle of the second light output by the light homogenizing rod 13 to that of the first light is not necessarily controlled with the small range, and the ratio may be greater than 0.3. To achieve light separation of the two lights using their etendue difference, the ratio of the divergence angle of the second light output from the light homogenizing rod 13 to that of the first light is less than or equal to 0.7.

In this embodiment, the first light and the second light are homogenized by the light homogenizing rod and then respectively incident on the wavelength conversion device and the scattering device, so that the light spot formed by the first light on the wavelength conversion layer is more uniform, which increases the excitation efficiency of the first light. The second light is decoherenced and homogenized by the light homogenizing rod, so that it can be more effectively scattered by the scattering device. However, in situations where requirements for uniformity of the first and second lights outputted by the light emitting device are not very high, the light homogenizing rod 13 can be omitted, so the light beam output by the collimating lens 123 of the emitting device 1 is directly incident on the light guidance device 2.

Alternatively, the light homogenizing rod of the light emitting device may be replaced by a fly-eye lens pair. Meanwhile, to ensure that the etendue difference between the first light and second light which are homogenized and output by the fly-eye lens pair is sufficiently large, the ratio of the light emitting surface area of the second laser array of the laser light source 11 to that of the first laser array is less than or equal to 0.3, so that the ratio of the respective areas of the light spot formed on the fly-eye lens pair by the second light and the first light is less than or equal to 0.3, and in turn, the ratio of the respective areas of the output light spots of the first light and second light output by the fly-eye lens pair is less than or equal to 0.3. Because the divergence angles of the first light and the second light outputted by the fly-eye lens pair are the same, but their light emitting surface area are very different, these two lights can be separated based on their etendue difference.

In this embodiment, the collimating lens 123 of the light collecting system 12 may alternatively be a concave lens. When the collimating lens 123 is a convex lens, the distance between the first collecting lens 121 and the collimating lens 123 within the light collecting system 12 is the sum of the focal lengths of these two lenses. When the collimating lens 123 is a concave lens, the distance between the first collecting lens 121 and the collimating lens 123 within the light collecting system 12 is the difference between the focal lengths of these two lenses, so the light path of the light collecting system 12 can be shorter.

In this embodiment, the first collecting lens 121 may also be made without the aperture. This way, the second light of the light emitted by the laser light source 11 is sequentially collected by the first collecting lens 121 and the second collecting lens 122, and then collimated by the collimating lens 123; i.e., the second region of the collecting device of the light collecting system includes the first collecting lens 121 and the second collecting lens 122. Hence, the divergence angle of the second light after the light collecting system 12 is increased by a rate which is the ratio of the combined focal length of the second region to the focal length of the collimating lens 123, i.e., the ratio of the combined focal length of the first collecting lens 121 and the second collecting lens 122 to the focal length of the collimating lens 123.

Thus, by designing the respective focal lengths of the first collecting lens 121 and the second collecting lens 122 and their combined focal length, the ratio of the divergence angle of the second light to that of the first light after the light collecting system 12 can be changed. In a situation where the combined focal length of the first collecting lens 121 and the second collecting lens 122 is greater than the focal length of the first collecting lens 121, in the laser light source 11 the second laser array surrounds the first laser array; the light emitted by the first laser array is sequentially collected by the first collecting lens and the second collecting lens, and the light emitted by the second laser array is only collected by the first collecting lens 121.

Figure 3:
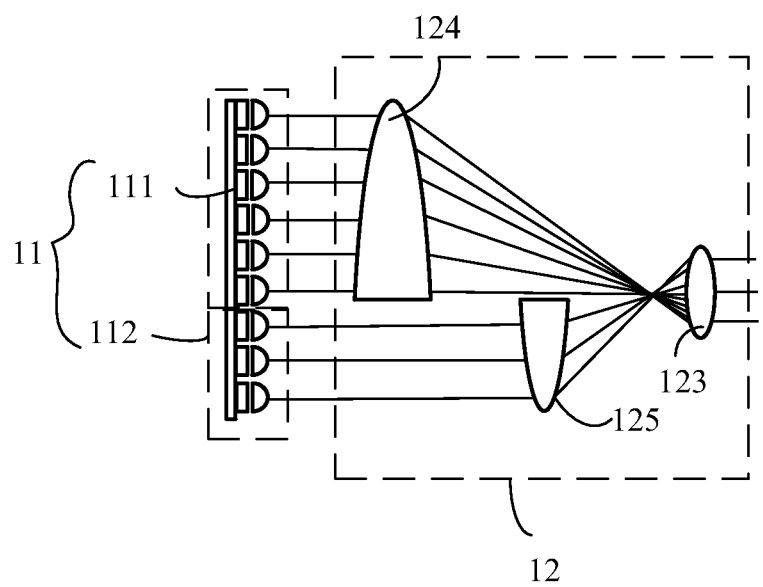
FIG. 3 schematically illustrates a light emitting device of the light source system of FIG. 2A according to another embodiment.

In this embodiment, the spatial relationship of the first laser array 111 and the second laser array 112 may be other than the former surrounding the latter, but are arranged side by side. Refer to FIG. 3, which schematically illustrates a light emitting device of the light source system of FIG. 2A according to another embodiment. A difference between this embodiment and the light emitting device of the embodiment of FIG. 2A is that, in this embodiment, the first laser array 111 and the second laser array 112 are arranged side by side. The first collecting lens 124 and the second collecting lens 125 of the light collecting system 12 are respectively disposed on the output light paths of the first laser array 111 and the second laser array 112, to condense the light emitted by the corresponding laser arrays to the collimating lens 123.

In this embodiment, the first collecting lens 124 and the second collecting lens 125 are both confocal with the collimating lens 123. From the above description, it can be seen that the ratio of the divergence angle of the second light to that of the first light after the light collecting system 12 is equal to the ratio of the focal length of the second collecting lens 125 to the focal length of the first collecting lens 124. Therefore, in this embodiment, the ratio of the focal length of the second collecting lens to the focal length of the first collecting lens is still less than or equal to 0.7.

In the light emitting device of FIG. 3, the first collecting lens 124, second collecting lens 125 and the collimating lens 123 of the light collecting system are all confocal. In practical applications, the first and/or second collecting lens can alternatively be non-confocal with the collimating lens. Because the divergence angle of the light beam outputted by the collimating lens will increase when the collecting lens and the collimating lens are non-confocal, the first collecting lens and second collecting lens of the light collecting system can use lenses of the same focal lengths, where the second collecting lens 125 is confocal with the collimating lens 123, and the first collecting lens 124 is non-confocal with the collimating lens 123; the distance between the two focal points depends on the desired divergence angle of the first light after the collimating lens 123, as long as the ratio of the divergence angle of the second light to that of the first light after the collimating lens 123 is less than or equal to 0.7. Alternatively, the first and second collecting lenses may have different focal lengths, and at the same time the first collecting lens and collimating lens can be con-confocal, in order to increase the difference between the divergence angles of the first and second lights after the collimating lens.

In some instances, the difference in the numbers of laser elements required in the first laser array and the second laser array is relatively large, and therefore the size difference between the first collecting lens and the second collecting lens is also relatively large; meanwhile the first collecting lens and the second collecting lens need to be confocal, and their common focal point need to be located on the optical axis between the first and second collecting lenses, as a result, the first light has a large bending angle when it passes the first collecting lens, which in turn a causes large loss of the light. Moreover, when the number of laser elements in the first laser array is large, the size of the first collecting lens is large, so its focal distance is also large, resulting in a long optical path. To solve these problems, the embodiments shown in FIGS. 4A and 4B provide respective solutions.

Figure 4A:
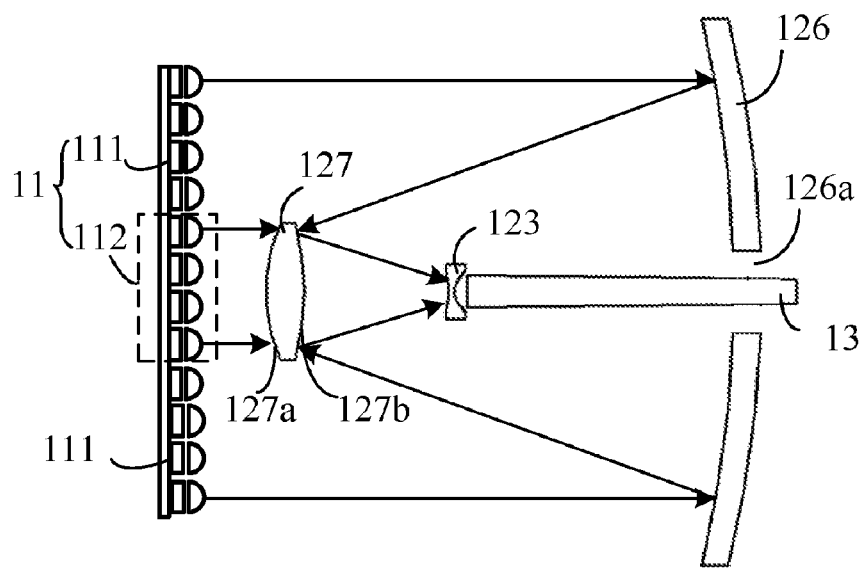
FIG. 4A schematically illustrates the structure of a light emitting device according to another embodiment of the present invention.
Figure 4B:
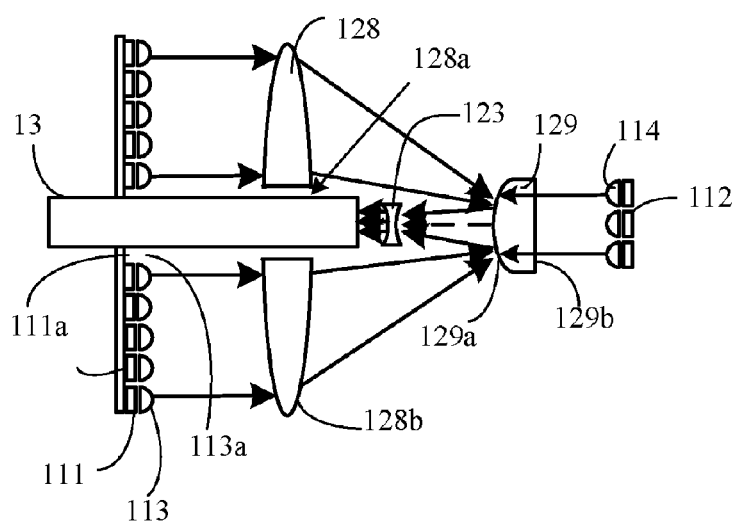
FIG. 4B schematically illustrates the structure of a light emitting device according to another embodiment of the present invention.

Refer to FIG. 4A, which schematically illustrates the structure of a light emitting device according to an embodiment of the present invention. The light emitting device includes a laser light source 11, a light collecting system and a light homogenizing rod 13. Differences between this embodiment and the embodiment of FIG. 3 include:

The light collecting system includes a collecting device and a collimating lens 123. In this embodiment, the collecting device includes a reflector cup 126 and condenser lens 127. The first laser array 111 is arranged to surround the second laser array 112. The condenser lens 127 is located on the output path of the second light emitted by the laser light source 11, and avoids the output path of the first light, for condensing the second light. The condenser lens 127 has a first surface 127a and a second surface 127b opposite to each other, where the first surface 127a faces the laser light source 11, and the second surface 127*b* is coated with a filter film which transmits the second light and reflects the first light. The collimating lens 123 is disposed on the output light path of the condenser lens 127, for collimating the output light beam of the condenser lens 127.

The reflector cup 126 is disposed on the output light path of the laser light source 11, and located on a side that faces the second surface 127*b* of the condenser lens 127. In this embodiment, the reflector cup 126 may be an aluminum reflector, or a concave mirror coated with a reflecting film. The reflecting surface of the reflector cup 126 faces the laser light source 11, and is provided with an aperture 126*a* at a location corresponding to the output optical axis of the condenser lens 127. The first light emitted by the laser light source 11 is directly incident onto the reflector cup 126, is reflected and condensed onto the second surface 127*b* of the condenser lens 127, and then reflected by the second surface 127*b* to the collimating lens 123 to be collimated. The light homogenizing rod 13 is disposed on the output light path of the collimating lens 123, and penetrates through the aperture 126*a* of the reflector cup 126, for receiving the light from the collimating lens 123 and homogenizing it.

It can be seen from the above description that the second light sequentially goes through the second region of the collecting device (i.e. the first surface 127*a* and the second surface 127*b* of the condenser lens 127) and the collimating lens 123; the first light sequentially goes through the first region of the collecting device (i.e. the reflector cup 126, and the second surface 127*b* of the condenser lens 127) and the collimating lens 123. If the combined focal length of the reflector cup and the second surface 127*b* of the condenser lens 127 is f5, the focal length of the condenser lens 127 is f6, the focal length of the collimating lens 123 is f3, then the rate of increase of the divergence angle of the first light after the light collecting system 12 is f5/f3, and the rate of increase of the divergence angle of the second light after the light collecting system 12 is f6/f3. To ensure that the ratio of a divergence angle of the second light to that of the first light when entering the light homogenizing rod 13 is less than or equal to 0.7, the ratio f6/f5 should be less than or equal to 0.7.

In this embodiment, the first light of the light emitted by the laser light source is collected by two reflecting surfaces, while the second light is collected by a collecting lens. In a situation where the difference between the numbers of laser elements in the first laser array and the second laser array of the laser light source is large, this embodiment allows for adjustment of the focal length of the reflector cup to accomplish adjustment of the ratio of the divergence angles of the two light beams after the light collecting system. Moreover, by the cooperation of the reflector cup and the second surface of the collecting lens, the focusing of the first light occurs in two optical path segments, and the two optical path segments overlap in space, which shortens the optical path and reduces the size of the light emitting device.

Of course, in practical applications, the light homogenizing rod 13 does not have to penetrate through the aperture 126*a* of the reflector cup 126; this depends on the length of the light homogenizing rod 13 and the focal length of the reflector cup 126. Preferably, the light homogenizing rod 13 penetrates through the reflector cup 126, or the light output port of the light homogenizing rod 13 is located at the aperture of the reflector cup 126, so that even when the size of the aperture 126*a* of the reflector cup 126 is small, the output light of the light homogenizing rod 13 is not blocked by the reflector cup 126.

Refer to FIG. 4B, which schematically illustrates the structure of a light emitting device according to an embodiment of the present invention. The light emitting device includes a laser light source, a light collecting system and a light homogenizing rod 13. The light collecting system includes a collecting device and a collimating lens 123. Differences between this embodiment and the above embodiment are:

In this embodiment, the first laser array 111 and the second laser array 112 of the laser light source are located on different planes. The collecting device includes a first condenser lens 128 and a second condenser lens 129.

The first condenser lens 128 is a convex lens having an aperture 128*a*. The region 128*b* other than the aperture 128*a* is a focusing region; the focusing region 128*b* can focus the light beam to reduce the cross-sectional size of the laser light beam. The output light of the first laser array 111 is collimated by a first collimating lens array 113 and then directly incident on the focusing region 128*b* of the first condenser lens 128.

The focal length of the second condenser lens 129 (denoted F2) is smaller than the focal length of the first condenser lens 128. The second condenser lens 129 has a first surface 129*a* and a second surface 129*b* opposite each other; it is located between the first condenser lens 128 and the focal point of the first condenser lens 128, where the first surface 129*a* faces toward the first condenser lens 128, and the first surface 129*a* is coated with a filter film that reflects the first light and transmits the second light. The collimating lens 123 is located between the first condenser lens 128 and the second condenser lens 129. The output light from the first condenser lens 128 is directly incident on the first surface 129*a* of the second condenser lens 129, is reflected by it while maintaining the focusing, and is then incident on the collimating lens 123 to be collimated.

The light homogenizing rod 13 is located on the output light path of the collimating lens 123. The first laser array 111 and the first collimating lens array 113 have respective apertures 111*a* and 113*a* at locations corresponding to the optical axis of the collimating lens 123. The light homogenizing rod 13 sequentially penetrates through the aperture 128*a* of the first condenser lens 128, the aperture 113*a* of the first collimating lens array 113 and the aperture 111*a* of the first laser array 111. The first light that has been collimated by the collimating lens 123 enters the light homogenizing rod 13, is homogenized and then output from it.

The second laser array 112 of the laser light source and the one-to-one corresponding second collimating lens array 114 are disposed on a side of the second condenser lens 129 that faces away from the first condenser lens 128. The second light which has been collimated by the second collimating lens array 114 is directly incident on the second surface 129*b* of the second condenser lens 129, is condensed onto the collimating lens 123, and then collimated and output to the light homogenizing rod 13 to be mohogenized.

It can be seen from the above descriptions that the second light sequentially goes through the second region of the collecting device (i.e. the second surface 129*b* and the first surface 129*a* of the second condenser lens 129) and the collimating lens 123; the first light sequentially goes through the first region of the collecting device (i.e. the two surfaces of the first condenser lens 128, and the first surface 129*a* of the second condenser lens 129) and the collimating lens 123. If the combined focal length of the first condenser lens 128 and the first surface 129*a* of the second condenser lens is F1, and the focal length of the collimating lens is F3, then the rate of increase of the divergence angle of the first light after the light collecting system is F1/F3, and rate of increase of the divergence angle of the second light after the light collecting system is F2/F3. To ensure that the ratio of a divergence angle of the second light to that of the first light when entering the light homogenizing rod 13 is less than or equal to 0.7, the ratio F2/F1 should be less than or equal to 0.7.

In this embodiment, because the first laser array and the second laser array are not on the same plane, the width of the laser light source and the first condenser lens can be reduced. On the other hand, in the embodiment of FIG. 4A, the first laser array and the second laser array are on the same plane, which is beneficial for the purpose of centralized heat dissipation; moreover, because the light homogenizing rod does not penetrate through the laser light source, the heat dissipation device for the laser light source can be more easily provided.

In practical applications, the components of the light collecting system are not limited to the examples of the embodiments shown in FIGS. 3, 4A and 4B, but can use other components, so long as ratio of the rates of increase of the divergence angle for the first light of the light emitted by the laser light source to that of the second light, after respectively going through the optical components of the light collecting system, is less than or equal to 0.7.

Second Embodiment

In the first embodiment, the divergence angles of the first and second lights of the light emitted by the laser light source 11 of the light emitting device are the same, while by making these two light beams respectively go through different optical components of the light collecting system, the divergence angles of the two lights when entering the light homogenizing rod are changed, so that the ratio of the divergence angle of the second light to that of the first light, when they enter the light homogenizing rod, is less than or equal to 0.7. In this embodiment, the ratio of the divergence angles of the second light to that of the first light, when they are emitted from the laser light source, is already less than or equal to 0.7. Because the light output from the laser light source are relatively well collimated, even when the divergence angles of the second light and the first light are difference, the difference is still small; thus, the downstream light collecting system is used to increase the divergence angles of the two light beams by the same rate. This is described in more detail below.

Figure 5:
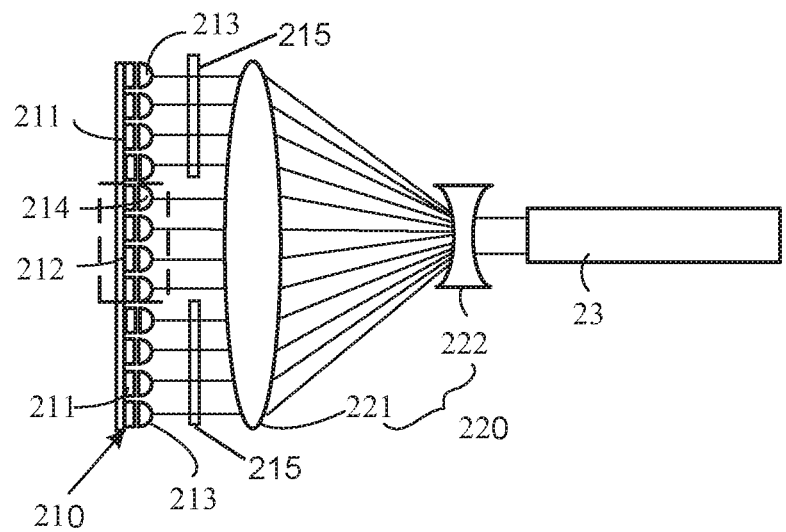
FIG. 5 schematically illustrates the structure of a light emitting device according to another embodiment of the present invention.

Refer to FIG. 5, which schematically illustrates the structure of a light emitting device according to another embodiment of the present invention. The light emitting device includes a laser light source 210, a light collecting system 220 and a light homogenizing rod 23.

Differences between this embodiment and the embodiment of FIG. 4 include:

The laser light source 210 includes a first laser array 211 and a second laser array 212, and first collimating lens array 213 and second collimating lens array 214 respectively corresponding to the first laser array and the second laser array. The divergence angles of the light emitted by the laser elements of the two laser arrays are the same, while the focal length of the collimating lenses of the second collimating lens array 214 is greater than the focal length of the collimating lenses of the first collimating lens array 213, so that the ratio of the divergence angle of the second light output from the second collimating lens array 214 to a divergence angle of the first light output from the first collimating lens array 213 is less than or equal to 0.7.

The light collecting system 220 includes a condenser lens 221 and a collimating lens 222 sequentially disposed on the output light path of the laser light source 210, where the two lenses are confocal. The output light of the laser light source 210 is collected by the condenser lens 221 and collimated by the collimating lens 222, to incident on the light homogenizing rod 23. From the above description, it can be seen that the divergence angles of the first light and the second light both increase after the light collecting system 220, and the rates of increase are both equal to the ratio of the focal length of the condenser lens 221 to that of the collimating lens 222. Of course, in practical applications, the focal points of the condenser lens 221 and the collimating lens 222 can be slightly spaced from each other, which will cause the rates of increase of the divergence angles of the first and second lights to be even larger.

In this embodiment, because the focal points and focal lengths of the various lenses or reflector cups in the light collecting system do not need to be controlled, and only the various collimating lenses in the laser light source need to be controlled by design, the design is simpler as compared to the first embodiment.

In this embodiment, the first collimating lens array 213 and second collimating lens array 214 of the laser light source 210 can use identical collimating lenses. In this case, the first laser array is designed to be off-focus from the lenses of the first collimating lens array, i.e. the laser elements of the first laser array are located on the optical axes of the corresponding collimating lenses of the first collimating lens array but at predetermined locations that are off from the focal points of the collimating lenses, so that the light emitted by the laser elements of the first laser array have a predetermined divergence angle which is larger than the divergence angle of the light emitted by the laser elements of the second laser array. Alternatively, the first and second collimating lens arrays can use identical collimating lenses, and both laser elements are not off-focus, but the divergence angle of the light emitted by the laser elements of the first laser array is larger than the divergence angle of the light emitted by the laser elements of the second laser array, such that the ratio of the divergence angle of the second light after collimation to that of the first light after collimation is less than or equal to 0.7. Of course, the system can also use at least two of the three designs, i.e. the design using laser elements of different divergence angles, the off-focus design, and the design using collimating lenses of different focal lengths, in order to increase the difference of the divergence angles of the first and second light of the light emitted by the laser light source.

Alternatively, in this embodiment, the first collimating lens array 213 and second collimating lens array 214 of the laser light source 210 can use identical collimating lenses; meanwhile, a scattering plate or a fly-eye lens pair 215 is provided on the propagation path of the first light in the laser light source, where the scattering plate or the fly-eye lens pair 215 avoids the propagation path of the second light. This way, these two optical elements can increase the divergence angle of the first light.

Figure 6:
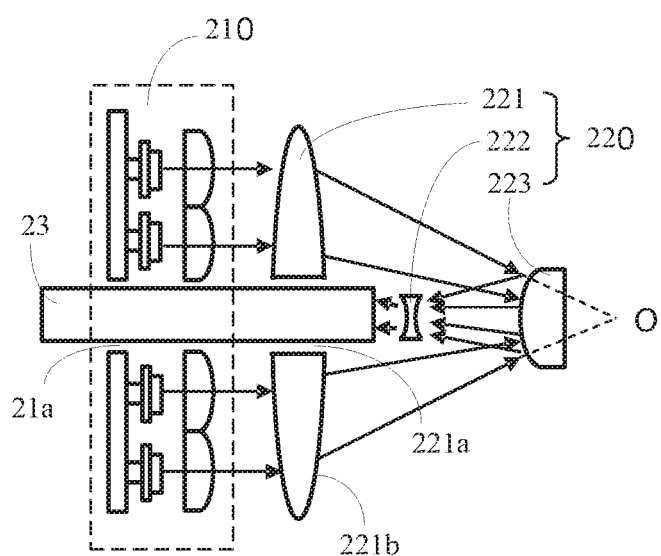
FIG. 6 schematically illustrates the structure of a light emitting device according to another embodiment of the present invention.

In the situation where the light output area of the laser light source 210 is relatively large, the size of the condenser lens 221 needs to be sufficiently large so as to completely collect the output light from the laser light source 210. However, the focal length of the condenser lens 221 is related to its size; the larger the size, the longer the focal length, in turn the longer the optical path of the light emitting device. To solve this problem, the embodiment shown in FIG. 6 provides a solution. Refer to FIG. 6, which schematically illustrates the structure of a light emitting device according to another embodiment of the present invention.

The light emitting device includes a laser light source 210, a light collecting system 220 and a light homogenizing rod 23.

Differences between this embodiment and the embodiment of FIG. 5 include:

In this embodiment, the light collecting system 220 includes a condenser lens 221, a second reflecting element 223, and a collimating lens 222. The condenser lens 221 is a convex lens with an aperture 221a, and the region 221b other than the aperture 221a is the focusing region. The focusing region 221b focuses the output light of the laser light source 210, to reduce the cross-sectional area of the laser light beam.

In this embodiment, the light collecting system 220 includes a condenser lens 221, a second reflecting element 223, and a collimating lens 222. The condenser lens 221 is a convex lens with an aperture 221a, and the region 221b other than the aperture 221a is the focusing region. The focusing region 221b focuses the output light of the laser light source 210, to reduce the cross-sectional area of the laser light beam.

Meanwhile, the laser light source 210 is provided with an aperture 21a at a location corresponding to the aperture 221a of the condenser lens 221, where no laser elements or collimating lenses are present at the aperture. The position of the light homogenizing rod 23 is such that it sequentially penetrates through the aperture 221a of the condenser lens 221 and the aperture 21a of the laser light source 210. The light entrance port of the light homogenizing rod 23 is adjacent the collimating lens 222, so that the light beam collimated by the collimating lens 222 enters the light homogenizing rod 23 to be homogenized.

This way, by the cooperation of the condenser lens 221 and the convex lens 223, the focusing of the light beam occurs in two optical path segments, and the two optical path segments overlap in space; as a result, the light collecting system in this embodiment shortens the length required to focus the output light of the laser light source 210, which in turn reduces the size of the light emitting device.

Figure 7:
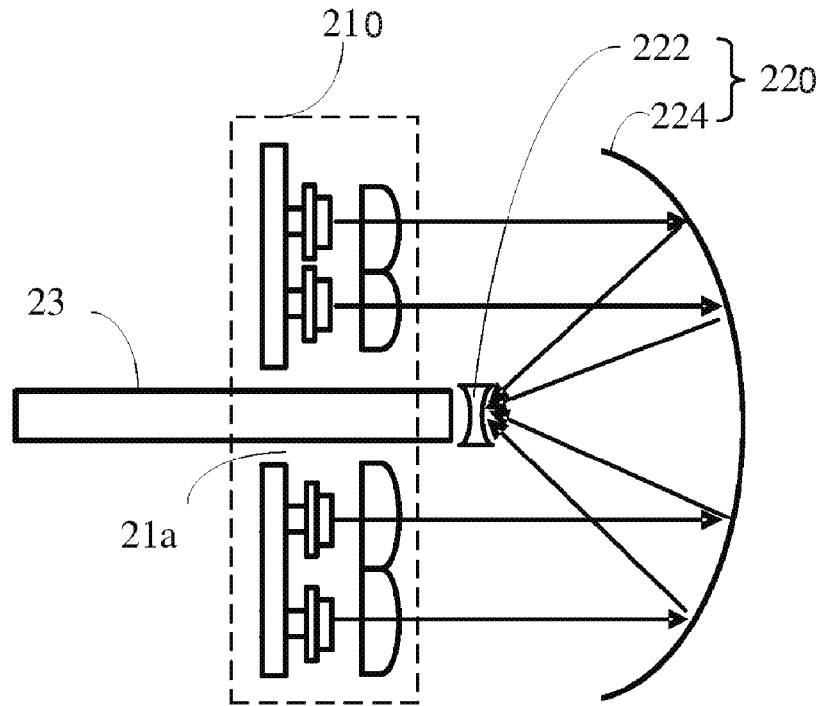
FIG. 7 schematically illustrates the structure of a light emitting device according to another embodiment of the present invention.

In the embodiment of FIG. 5, the condenser lens 221 of the light collecting system 220 can be replaced with a curved reflecting surface. Refer to FIG. 7, which schematically illustrates the structure of a light emitting device according to another embodiment of the present invention. The light emitting device includes a laser light source 210, a light collecting system 220 and a light homogenizing rod 23.

Different from the light emitting device of the embodiment shown in FIG. 5, here the light collecting system 220 includes a reflective focusing device 224 and a collimating lens 222. In this embodiment, the reflective focusing device 224 is a reflector cup, which may be an aluminum reflector, or a concave mirror coated with a reflecting film. The reflector cup 224 is located on the output light path of the laser light source 210, for reflecting and focusing the light emitted by the laser light source 210. The collimating lens 222 is located between the laser light source 210 and the reflector cup 224, for collimating the light beam from the reflector cup 224.

Meanwhile, the laser light source 210 is provided with an aperture 21a at a location corresponding to the output optical axis of the collimating lens 222, where no laser elements or collimating lenses are present in the aperture 21a. The light homogenizing rod 23 is disposed on the output light path of the collimating lens 222, and penetrates through the aperture 21a of the laser light source 210. The light beam collimated by the collimating lens 222 is incident on the light homogenizing rod 23 and homogenized by it before being output.

In this embodiment, by using the reflector cup, the optical path of the light collecting system 220 is folded and becomes shorter. Moreover, because the light homogenizing rod 23 penetrates through the laser light source 210, a part of the optical path of the light homogenizing rod 23 overlaps with the laser light source 210, further shortening the optical path of the light emitting device, so that the structure of the light emitting device is more compact and smaller.

Figure 8:
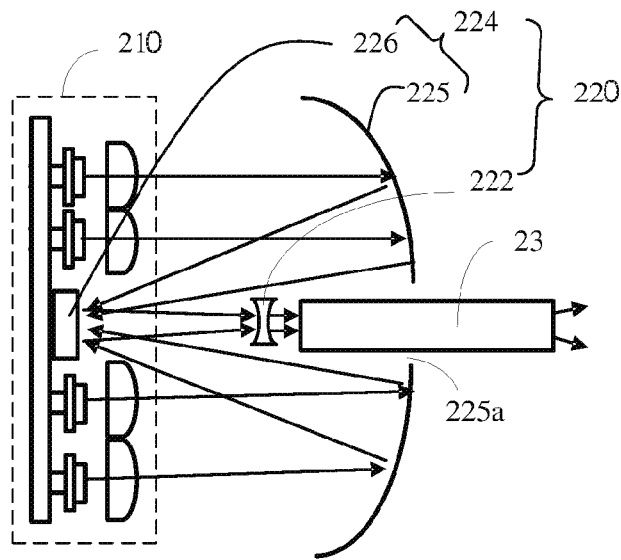
FIG. 8 schematically illustrates the structure of a light emitting device according to another embodiment of the present invention.

In the embodiment shown in FIG. 7, in the situation where the light output surface area of the laser light source 210 is very large, the size of the reflector cup 224 needs to be sufficiently large in order to completely collect the output light of the laser light source 210. This causes the focal length of the reflector cup 224 to be large and in turn the size of the light emitting device to be large. To solve this problem, the embodiment shown in FIG. 8 provides a solution. Refer to FIG. 8, which schematically illustrates the structure of a light emitting device according to another embodiment of the present invention. The light emitting device includes a laser light source 210, a light collecting system 220 and a light homogenizing rod 23.

Differences between this embodiment and the embodiment of FIG. 7 include:

In this embodiment, the laser light source 210 is not provided with an aperture. The reflective focusing device 224 includes a reflector cup 225 and a third reflecting element 226. The reflector cup 225 is provided with an aperture 225a in its center area, which is the non-focusing region, while the region 225b other than the aperture 225a is the focusing region. The reflector cup 225 is disposed on the output light path of the laser light source 210, for reflecting and focusing the output light of the laser light source 210.

In this embodiment, the third reflecting element 226 is a reflecting mirror. The reflecting mirror 226 is located between the reflector cup 225 and the laser light source 210, located between the reflector cup 225 and the focal point of the reflector cup 225, and is perpendicular to the output optical axis of the reflector cup 225, for reflecting the output light from the reflector cup 225 while maintaining its focusing.

The collimating lens 222 is located between the reflecting minor 226 and the reflector cup 225, for receiving the light beam from the reflecting mirror 226 and collimating it. To output the collimated light beam from the collimating lens 222, the light homogenizing rod 23 is located on the output light path of the collimating lens 222, and penetrates through the aperture 225a of the reflector cup 225, for receiving the light beam from the collimating lens 222 and homogenizing it before output.

This way, by the cooperation of the reflector cup 225 and the reflecting mirror 226, the focusing of the light beam occurs in two optical path segments, and the two optical path segments overlap in space; as a result, the length required to focus the output light of the laser light source 210 is shortened, which reduces the size of the light emitting device. An advantage of the reflecting mirror is its simple structure and low cost.

Moreover, because the reflecting mirror 226 is located relatively close to the laser light source 210, as shown in FIG. 8, an area of the laser light source 210 near its intersection with the output optical axis of the reflector cup 225 can be free of laser elements and collimating lenses, and the reflecting mirror 26 is mounted in this area of the laser light source 210 that is free of laser elements, to solve the problem caused by mounting a suspended reflecting mirror 26.

In this embodiment, when the position of the reflecting mirror 226 is unchanged, its focal point for the reflected light is also unchanged. In practical applications, the third reflecting element 226 may be replaced by a concave lens or a convex lens, where the concave lens or convex lens has a reflecting surface (e.g., by coating its surface with a reflective film). As compared to a reflecting mirror, light reflected by a convex lens can be focused at a closer location, and light reflected by a concave lens can be focused at a farther away location, and the curved surface of the concave lens or convex lens can be designed based on need to control the distance of the focal point of the reflected light. This way, by selecting a reflecting mirror, a concave lens or a convex lens, the location of the focal point of the reflected light can be controlled, which in turn controls the rate of increase of the divergence angle of the output light of the laser light source after the collecting system.

Further, because the size of the reflector cup 225 is large, its reflected light may have significant aberration, which cannot be eliminated by designing the curved surface of the reflector cup 225 alone. The reflector cup 225 and the reflecting surface of the concave lens or convex lens can cooperate with each other to eliminate aberration. Therefore, when cost is not a great concern, the third reflecting element is preferably a concave lens having a concave reflecting surface or convex lens having a convex reflecting surface. It should be noted that the concave lens having a concave reflecting surface can be replaced by a reflective aluminum plate having a concave reflecting surface, which can achieve the same effect; similarly, the convex lens having a convex reflecting surface can be replaced by a reflective aluminum plate having a convex reflecting surface.

It should also be noted that in this embodiment, the output plane of the light homogenizing rod 23 protrudes out from the aperture 225a of the reflector cup 225, which is beneficial for clamping and mounting the light homogenizing rod 23. In other embodiments, the reflective focusing device 224 and the light homogenizing rod 23 can be adjusted so that the output plane of the light homogenizing rod 23 is located right at the aperture 225a of the reflector cup 225, which can make the overall structure of the light emitting device more compact. In this situation, the output port of the light homogenizing rod 23 can be covered with a transparent glass plate, so as to form a closed space to prevent dust from entering. Of course, the reflective focusing device 224 and the light homogenizing rod 23 can also be adjusted such that the output plane of the light homogenizing rod 23 is located between the reflector cup 225 and the laser light source 210. In this situation, the light collecting system 220 can further includes a lens, which collimates or focuses the output light from the light homogenizing rod 23 and provide it to the downstream optical elements. This lens can be mounted at the aperture 225a of the reflector cup 225, so that the overall structure of the light emitting device is compact.

In the first embodiment, the first light and the second light have the same divergence angle when output from the laser light source, and then by using the different optical elements of the light collecting system, the divergence angles of these two light beams are increased by different amounts, such that when they are output from the light collecting system, the ratio of the divergence angle of the second light to that of the first light is less than or equal to 0.7. In the second embodiment, the ratio of the divergence angle of the second light to that of the first light is already less than or equal to 0.7 when the two lights are output from the laser light source, and the divergence angles are increased by the same rate by the light collecting system, so that when the two lights are output from the light collecting system, the ratio of the divergence angle of the second light to that of the first light is less than or equal to 0.7. In practical applications, the approaches of the first embodiment and the second embodiment can be combined, i.e., the divergence angle of the second light is smaller than that of the first light when the lights are output from the laser light source, and then when going through the light collecting system, the divergence angles are increased by different rates, where the rate of increase for the second light is larger than the rate of increase for the first light, so that when the two lights are output from the light collecting system, the ratio of the divergence angle of the second light to that of the first light is less than or equal to 0.7

Third Embodiment

In the first and second embodiments, both lights emitted by the laser light source are collected by the collecting element of the light collecting system and enter the collimating lens to be collimated. This way, in the output light from the collimating lens, the small light beams in the first and second lights are all parallel to each other, so the divergence angles of the first and second light are respectively the divergence angles of the small light beams within each light. However, in practical applications, in situations when the requirements for uniformity of the first and second lights emitted by the light emitting device are not very high, the collimating lens can be omitted from the light collecting system, such that the light emitted by the laser light source is condensed and then directly enters the light homogenizing rod. This is explained in more detail below.

Figure 9:
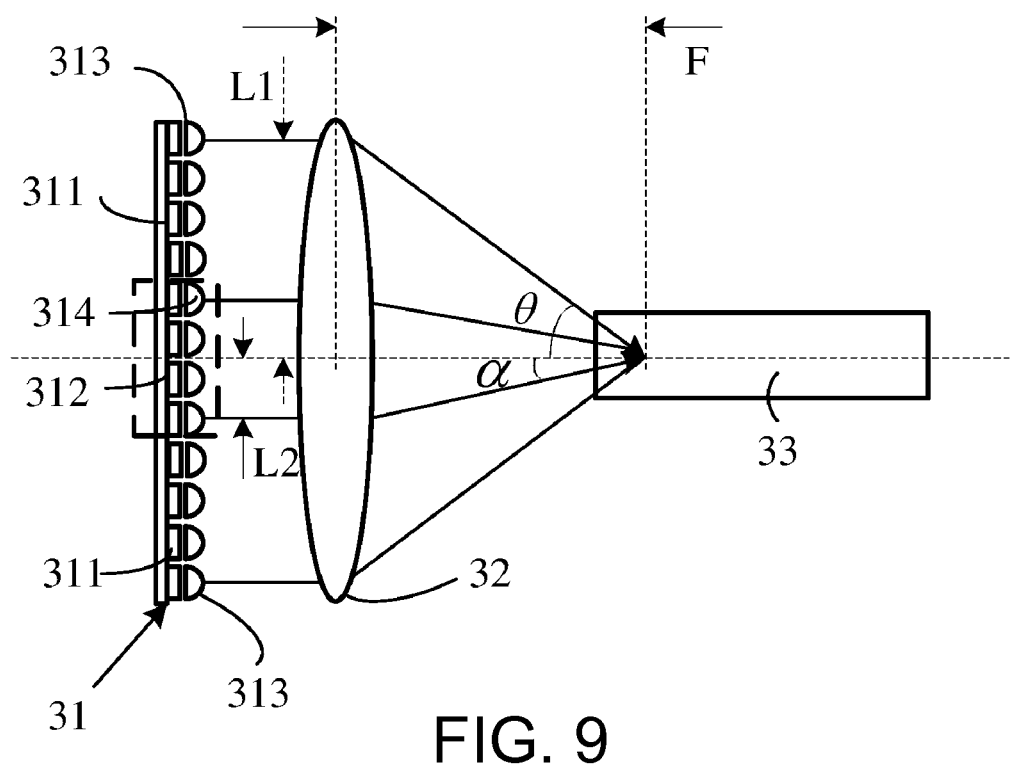
FIG. 9 schematically illustrates the structure of a light emitting device according to another embodiment of the present invention.

Refer to FIG. 9, which schematically illustrates the structure of a light emitting device according to another embodiment of the present invention. The light emitting device includes a laser light source 31, a light collecting system and a light homogenizing rod 33.

Differences between this embodiment and the embodiment of FIG. 5 include:

The laser light source 31 includes a first laser array 311, a second laser array 312, a first collimating lens array 313 and a second collimating lens array 314. The first laser array 311 is disposed surrounding the second laser array 312, and the second laser array 312 is disposed around the optical axis M. The collimating lenses in the first and second collimating lens arrays respectively correspond one to one with the laser elements of the first and second laser arrays for collimating the light emitted by the corresponding laser elements.

The light collecting system includes a condenser lens 32, for condensing the light emitted by the laser light source 31 to the light homogenizing rod 33 to be homogenized. The optical axis of the condenser lens 32 coincides with the optical axis M. Because the light emitted by the laser light source is condensed by the condenser lens 32 and directly enters the light homogenizing rod 33, at the entrance port of the light homogenizing rod, the divergence angle of the first light is θ. If the first light emitted by the laser light source 31 that is farthest away from the optical axis M has a distance L1 from the optical axis M, the focal length of the condenser lens 32 is F, then $\tan \theta = L1/F$. If the divergence angle of the second light is α, and the second light emitted by the laser light source 31 that is farthest away from the optical axis M has a distance L2 from the optical axis M, then $\tan \alpha = L2/F$.

Therefore, in this embodiment, in order to control the first light and the second light output by the light emitting device to have different divergence angles, the sizes of the first light and the second light incident on the condenser lens 32 are respectively controlled. In this embodiment, to make α/θ less than or equal to 0.7, the ratio of arctan(L2/F) to arctan(L1/F) should be less than or equal to 0.7.

In the above examples, the first light and second light are blue lights in different wavelength ranges. Of course, in practical applications, the first and second lights may be other colored lights and not limited to the above examples.

In the above embodiments, each light emitting device can be used in a light sources system of FIG. 2A. But in practical applications, each light emitting device can also be used in other applications. For example, the first light may be a blue laser light and the second light may be a red laser light. In the optical path downstream from the light emitting device, a small reflecting mirror may be used to reflect the second light of the output of the light emitting device to separate the two light beams. Alternatively, a reflecting mirror with an aperture may be used to receive the output light of the light emitting device, where the second light passes through the aperture of the reflecting mirror, while the first light is reflected by the regions of the reflecting mirror other than the aperture, so as to separate these two lights. Of course, the first light may be a red light and the second light a blue light, depending on demands of the practical applications.

The various embodiments in this disclosure are described in a progressive manner, where each embodiment is described by emphasizing its differences from other embodiments. The common or similar features of the embodiments can be understood by referring to each other.

Embodiments of the present invention also provide a projection system, including a light source system which has the structures and functions of the light source system of the above described embodiments. The projection system may employ various projection technologies, such as liquid crystal display (LCD) projection technology, digital light processor (DLP) projection technology, etc. Further, the above described light emitting devices can also be used in illumination systems, such as stage lighting.

The above descriptions disclose the embodiments of the present invention, but do not limit the scope of the invention. Thus, it is intended that the present invention cover modifications and variations that come within the scope of the appended claims and their equivalents, as well as direct or indirect applications of the embodiments in other related technical fields.

What is claimed is:

1. A light emitting device of comprising:
a laser light source, including a first laser array and a second laser array, for respectively generating a first light and a second light having different wavelength ranges, wherein in output light of the laser light source, a divergence angle of the first light is greater than a divergence angle of the second light; and
a light collecting system, for collecting the lights generated by the laser arrays, wherein the light collecting system includes a collecting device and a collimating lens, wherein the collecting device includes at least one condenser lens for condensing light beams from the laser light source, and wherein the collimating lens collimates a light beam from the collecting device;
a light homogenizing rod, for homogenizing a light from the light collecting system, wherein all cross sections of the light homogenizing rod in a direction perpendicular to the light homogenizing rod are identical;
wherein the laser light source includes an emitting region and a non-emitting region, wherein the first and second laser arrays are located in the emitting region;
wherein the collecting device includes a first region and a second region, the first region being a region where the first light passes, the second region being a region where the second light passes, wherein a combined focal length of the first region is greater than a combined focal length of the second region,
wherein the light collecting system includes a reflective focusing device and a collimating lens, wherein the reflective focusing device includes a focusing region and a non-focusing regions, wherein the focusing region focuses output light from the laser light source and reflects the output light to the collimating lens, wherein the collimating lens collimates the light from the reflective focusing device and outputs the collimated light to the light homogenizing rod; and
wherein the non-emitting region of the laser light source and the non-focusing region are located on a same straight line parallel to an output optical axis of the laser light source, and the light homogenizing rod penetrates through the non-emitting region or the non-focusing region or both, and
wherein a ratio of a divergence angle of the second light after the light collecting system to a divergence angle of the first light after the light collecting system is less than a predetermined value, wherein the predetermined value is 0.7.

2. A light emitting device comprising:
a laser light source, including a first laser array and a second laser array, for respectively generating a first light and a second light having different wavelength ranges, wherein in output light of the laser light source, a divergence angle of the first light is greater than a divergence angle of the second light; and
a light collecting system, for collecting the lights generated by the laser arrays, wherein the light collecting system includes a collecting device and a collimating lens, wherein the collecting device includes at least one condenser lens for condensing light beams from the laser light source, and wherein the collimating lens collimates a light beam from the collecting device;
wherein the collecting device includes a first region and a second region, the first region being a region where the first light passes, the second region being a region where the second light passes, wherein a combined focal length of the first region is greater than a combined focal length of the second region,
wherein the first region of the collecting device includes a first collecting lens, disposed on an output light path of the laser light source, wherein a part of the first collecting lens condenses the first light; wherein the second region of the collecting device includes a second collecting lens, disposed on an output light path of the second light that has passed through the first collecting lens, to condense the second light, and
wherein a ratio of a divergence angle of the second light after the light collecting system to a divergence angle of the first light after the light collecting system is less than a predetermined value, wherein the predetermined value is 0.7.

3. The light emitting device of claim 2, wherein the laser light source further includes a first collimating lens array and a second collimating lens array, wherein collimating lenses in the first and second collimating lens arrays respectively correspond one to one with laser elements of the first and second laser arrays, for collimating light emitted by the corresponding laser elements; and
wherein a focal length of the collimating lenses of the second collimating lens array is greater than a focal length of the collimating lenses of the first collimating lens array, so that a ratio of a divergence angle of the collimated second light to a divergence angle of the collimated first light is less than or equal to the predetermined value; or, a degree of off-focus of the laser elements of the first laser array and their corresponding collimating lenses is greater than a degree of off-focus of the laser elements of the second laser array and their corresponding collimating lenses, so that a ratio of a divergence angle of the collimated second light to a divergence angle of the collimated first light is less than or equal to the predetermined value, or, a divergence angle of light emitted by the laser elements of the first laser array is greater than a divergence angle of light emitted by the laser elements of the second laser array, so that a ratio of a divergence angle of the collimated second light to a divergence angle of the collimated first light is less than or equal to a predetermined value.

4. The light emitting device of claim 2, further comprising a scattering plate or a fly-eye lens pair disposed on a propagation path of the first light within the laser light source, wherein the scattering plate or the fly-eye lens pair avoids a propagation path of the second light.

5. The light emitting device of claim 2, further comprising a light homogenizing rod for homogenizing a light from the light collecting system, wherein all cross sections of the light homogenizing rod in a direction perpendicular to the light homogenizing rod are identical.

6. The light emitting device of claim 2, wherein the predetermined value is 0.3.

7. A light source system, comprising:
the light emitting device of claim 2;
a wavelength conversion device, having a wavelength conversion layer which absorbs the first light from the light emitting device to generate a converted light; wherein one surface of the wavelength conversion layer receives the first light, and outputs from the same surface at least a part of the first light, and at least a part of the converted light or at least a part of a mixed light of the converted light and unabsorbed first light;
a scattering device, including a scattering layer which scatters the second light from the light emitting device; wherein the scattering layer receives the second light on one surface, and outputs on the same surface at least a part of the second light; and
a light guidance device, including a first region, wherein the second light and the first light from the light emitting device are incident on the light guidance device from a first light path, wherein at least a part of the second light is incident on the first region, and at least a part of the first light is incident on a region of the light guidance device other than the first region; wherein the light incident on the region of the light guidance device other than the first region is guided to the wavelength conversion device, and the light incident on the first region of the light guidance device is guided to the scattering device; wherein the region of the light guidance device other than the first region further guides the converted light from the wavelength conversion device and the second light from the scattering device to a second light path to be output.

8. A light emitting device comprising:
a laser light source, including a first laser array and a second laser array, for respectively generating a first light and a second light having different wavelength ranges, wherein in output light of the laser light source, a divergence angle of the first light is greater than a divergence angle of the second light; and
a light collecting system, for collecting the lights generated by the laser arrays, wherein the light collecting system includes a collecting device and a collimating lens, wherein the collecting device includes at least one condenser lens for condensing light beams from the laser light source, and wherein the collimating lens collimates a light beam from the collecting device;
a light homogenizing rod,
wherein the collecting device includes a first region and a second region, the first region being a region where the first light passes, the second region being a region where the second light passes, wherein a combined focal length of the first region is greater than a combined focal length of the second region,
wherein the collecting lens device includes a first condenser lens and a second condenser lens, the second condenser lens being disposed between the first condenser lens and a focal point of the first condenser lens, the second condenser lens having a first surface facing the first condenser lens and a second surface opposite the first surface, wherein the second surface is provided with a filter film which transmits the second light and reflects the first light;
wherein the first laser array is disposed on a side of the first condenser lens that faces the second condenser lens, the second laser array is disposed on a side of the second condenser lens that faces away from the first condenser lens, wherein the first laser array and the first condenser lens respectively have apertures at locations corresponding to an optical axis of the collimating lens, wherein the light homogenizing rod is disposed on an output light path of the collimating lens and sequentially penetrates through the apertures of the first condenser lens and the first laser array;
wherein the first light from the first laser array is collected by the first condenser lens to the first surface of the second condenser lens, is reflected by the first surface of the second condenser lens to the collimating lens, and then enters the light homogenizing rod; and
wherein the second light from the second laser array is collected by the second condenser lens to the collimating lens, is collimated by the collimating lens and then enters the light homogenizing rod, and
wherein a ratio of a divergence angle of the second light after the light collecting system to a divergence angle of the first light after the light collecting system is less than a predetermined value, wherein the predetermined value is 0.7.

9. The light emitting device of claim 8, further comprising a scattering plate or a fly-eye lens pair disposed on a propagation path of the first light within the laser light source, wherein the scattering plate or the fly-eye lens pair avoids a propagation path of the second light.

10. The light emitting device of claim 8, wherein the predetermined value is 0.3.

11. A light source system, comprising:
the light emitting device of claim 8;
a wavelength conversion device, having a wavelength conversion layer which absorbs the first light from the light emitting device to generate a converted light; wherein one surface of the wavelength conversion layer receives the first light, and outputs from the same surface at least a part of the first light, and at least a part of the converted light or at least a part of a mixed light of the converted light and unabsorbed first light;

a scattering device, including a scattering layer which scatters the second light from the light emitting device; wherein the scattering layer receives the second light on one surface, and outputs on the same surface at least a part of the second light; and a light guidance device, including a first region, wherein the second light and the first light from the light emitting device are incident on the light guidance device from a first light path, wherein at least a part of the second light is incident on the first region, and at least a part of the first light is incident on a region of the light guidance device other than the first region; wherein the light incident on the region of the light guidance device other than the first region is guided to the wavelength conversion device, and the light incident on the first region of the light guidance device is guided to the scattering device; wherein the region of the light guidance device other than the first region further guides the converted light from the wavelength conversion device and the second light from the scattering device to a second light path to be output.

12. A light source system, comprising:

the light emitting device of claim 1;

a wavelength conversion device, having a wavelength conversion layer which absorbs the first light from the light emitting device to generate a converted light; wherein one surface of the wavelength conversion layer receives the first light, and outputs from the same surface at least a part of the first light, and at least a part of the converted light or at least a part of a mixed light of the converted light and unabsorbed first light;

a scattering device, including a scattering layer which scatters the second light from the light emitting device; wherein the scattering layer receives the second light on one surface, and outputs on the same surface at least a part of the second light; and a light guidance device, including a first region, wherein the second light and the first light from the light emitting device are incident on the light guidance device from a first light path, wherein at least a part of the second light is incident on the first region, and at least a part of the first light is incident on a region of the light guidance device other than the first region; wherein the light incident on the region of the light guidance device other than the first region is guided to the wavelength conversion device, and the light incident on the first region of the light guidance device is guided to the scattering device; wherein the region of the light guidance device other than the first region further guides the converted light from the wavelength conversion device and the second light from the scattering device to a second light path to be output.

13. The light emitting device of claim 1, wherein the reflective focusing device includes a condenser lens with an aperture and a reflecting element, wherein the aperture of the condenser lens is the non-focusing region, and wherein regions of the condenser lens other than the aperture and the reflecting element are the focusing region;

wherein the region of the condenser lens other than the aperture condenses output light from the laser light source, and the reflecting element reflects a light from the condenser lens to the collimating lens; and wherein the light homogenizing rod penetrates through the aperture of the condenser lens and the non-emitting region of the laser light source.

14. The light emitting device of claim 1, wherein the reflective focusing device is a reflecting cup, wherein a center region of the reflecting cup is the non-focusing region, and a region other than the center region is the focusing region, and wherein the light homogenizing rod penetrates through the non-emitting region of the laser light source.

15. The light emitting device of claim 1, wherein the reflective focusing device includes a reflecting element and a reflecting cup with an aperture, wherein the aperture of the reflecting cup is the non-focusing region, and regions other than the aperture and the reflecting element are the focusing region; and wherein the light homogenizing rod penetrates through the aperture of the reflecting cup.

16. The light emitting device of claim 15, further comprising a third reflecting element mounted in the non-emitting region of the laser light source.

17. The light emitting device of claim 1, further comprising a scattering plate or a fly-eye lens pair disposed on a propagation path of the first light within the laser light source, wherein the scattering plate or the fly-eye lens pair avoids a propagation path of the second light.

18. The light emitting device of claim 1, wherein the predetermined value is 0.3.

* * * * *